United States Patent [19]

O'Melia

[11] 3,890,440

[45] June 17, 1975

[54] NEMATICIDAL COMPOSITIONS COMPRISING 2-CHLORO-6-METHOXY-4-(TRICHLOROMETHYL)-PYRIDINE AND S-METHYL N-[(METHYL CARBAMOYL)OXY]THIOACETIMIDATE

[75] Inventor: Frances C. O'Melia, Pleasant Hill, Calif.

[73] Assignee: The Dow Chemical Company, Midland, Mich.

[22] Filed: Mar. 25, 1974

[21] Appl. No.: 454,203

[52] U.S. Cl. ............... 424/263; 424/298; 424/300
[51] Int. Cl.$^2$ ................ A01N 9/12; A01N 9/22
[58] Field of Search ................ 424/263, 300, 298

[56] References Cited
UNITED STATES PATENTS 3,244,722   4/1966   Johnston et al ............... 424/263 X

OTHER PUBLICATIONS

Pesticide Index, Frear, pg. 272, 4th Ed., 1969.

*Primary Examiner*—Albert T. Meyers
*Assistant Examiner*—Leonard Schenkman
*Attorney, Agent, or Firm*—S. Preston Jones

[57] ABSTRACT

Pesticidal compositions containing a mixture of 2-chloro-6-methoxy-4-(trichloromethyl)-pyridine and S-methyl N-[(methyl carbamoyl)oxy]thioacetimidate are disclosed. Such compositions are useful in the treating and disinfection of soil infested with nematodes, it having been found that the toxic ingredients of said compositions are mutually activating.

6 Claims, No Drawings

NEMATICIDAL COMPOSITIONS COMPRISING 2-CHLORO-6-METHOXY-4-(TRICHLOROMETHYL)-PYRIDINE AND S-METHYL N-[(METHYL CARBAMOYL)OXY]THIOACETIMIDATE

BACKGROUND OF THE INVENTION

It is an object of this invention to provide new nematicidal compositions which are useful in the control in soil of nematodes and other invertebrate organisms which attack plant roots. A further object is to supply a new agronomic practice for improving the plant growing properties of soil and the ability of soil to support the growth of crops. An additional object is the provision of a new method and composition for treating soil to obtain improved controls of soil-dwelling invertebrate organisms such as nematodes.

PRIOR ART

The 2-chloro-6-methoxy-4-(trichloromethyl)pyridine employed in accordance with the teachings of the present invention is a light yellow non-viscous liquid having a boiling point of 130°C. at 2 milliliters of mercury and a vapor pressure of $6.5 \times 10^{-3}$ mm at 25°C. and which has very low water solubility and is soluble in many common organic solvents. The compound is taught in U.S. Pat. No. 3,244,722 and can be prepared by reacting 2,6-dichloro-4-(trichloromethyl)pyridine with sodium metal and methanol at reflux temperature for from about 2–15 hours with production of the desired 2-chloro-6-methoxy-4-(trichloromethyl)pyridine, The product is removed by distilling off the solvent, extraction with a solvent, filtering off the by-products, removing the solvent and recovering the product as a residue.

The S-methyl N-[(methyl carbamoyl)oxy]thioacetimidate employed in accordance with the teachings of the present invention is a white solid melting at 78°–79°C. which is slightly soluble in water and soluble in many common organic solvents. The compound is taught in U.S. Pat. No. 3,506,698 and can be prepared by the reaction of methyl isocyanate with methyl thiolacetohydroxamate in water. The methyl isocyanate is added to a mixture of the methyl thiolacetohydroxamate in water at a temperature of between 20°–35°C. The mixture is thereafter heated to 50°–55°C. and after the completion of the reaction, the mixture is cooled to about 2°C. The solid product precipitates as a solid and is recovered by filtration.

SUMMARY OF THE INVENTION

The new nematocidal compositions of the present invention comprises about 1 part by weight of 2-chloro-6-methoxy-4-(trichloromethyl)pyridine in admixture with from about ⅛ to about 16 parts by weight of S-methyl N-[(methyl carbamoyl)oxy]thioacetimidate. This composition conveniently adapts itself to the treatment of soil or other growth media to improve the ability of the soil to support plant growth and to benefit the plants grown in the treated soil. Such practice protects the plants from the ravages of soil-dwelling invertebrate organisms which attack their roots and improves the growth and harvest of crop plants. It has also been found that the treatment accomplishes changes in the soil which stimulate the growth and improve the growth characteristics of crops grown therein. It is among the advantages of the present invention that the toxicants in the mixture appear to be mutually activating so that a greater than additive or synergistic result is accomplished as regards the effect on the plant growing properties of the soil and the control of undesirable organisms and particularly invertebrates such as nematodes.

The composition comprising the mixture of toxicants, is sufficiently increased in effectiveness so as to permit the effective utilization of reduced amounts of the 2-chloro-6-methoxy-4-(trichloromethyl)pyridine and the S-methyl N-[(methyl carbamoyl)oxy]thioacetimidate, The crop yields and the control of soil-dwelling organisms obtained are much superior to those obtained when either of the constituents of the mixture is employed alone. An additional advantage is that these reduced effective dosages of the mixture of toxicants materially reduce the hazards of soil residues. Thus, the practice of the present invention provides a very desirable economic advantage for the agriculturalist.

2-Chloro-6-methoxy-4-(trichloromethyl)pyridine is a mobile liquid, and S-methyl N-[(methyl carbamoyl)oxy]thioacetimidate is a crystalline solid. Mixtures of the compounds are somewhat soluble in many organic solvents and of low solubility in water. They are adapted to be readily and conveniently distributed in soil. Further, when so employed, the compounds accomplish a substantially complete kill of nematodes, and induce soil changes which improve the ability of the soil to support plant growth and the growth characteristics of crops raised on the treated soil. It is among the advantages of the present invention that mixtures of these compounds, while sufficiently persistent to accomplish the desired effect upon the soil and upon soil-inhabiting organisms, dissipate in a reasonable period of time.

The distribution of at least a minimum effective dosage of the mixture of 2-chloro-6-methoxy-4-(trichloromethyl)pyridine and S-methyl N-[(methyl carbamoyl)oxy]thioacetimidate in soil is essential and critical for the practice of the present invention. In general, good improvement in the ability of the soil to support plant growth and good control of nematodes and other root attacking invertebrate organisms are obtained when said mixed compounds are distributed in soil in an amount of at least about 0.25 part by weight of the mixed compounds per million parts by weight of the soil. A good working range is from about 0.25 to about 600 parts by weight of the mixed compounds per million parts by weight of the soil.

In general field applications, it is usually preferred that the compounds be distributed in the soil to a depth of from 3 to 12 inches at rates of from about 0.013 to about 20 pounds per treated acre [1 pound distribution through 3 inches of soil is approximately 1 part of the active compound mixture per million parts of soil (ppm)]. Oftentimes it is desirable to distribute the compounds to a depth of as much as 48 inches at rates of as much as 48 pounds per treated acre to avoid reinfestation of the soil by deep dwelling nematodes which cause plant disease. Rates as low as 0.25 pounds per overall acre may be employed in row or band applications where the treated band in which the crop is seeded or transplanted occupies as little as one-eighth of the overall area on which the crop is being grown.

When compositions embodying a liquid or solid carrier are used, as hereinafter described, the amount of the composition is adjusted to distribute substantially the above described amounts of the active toxicant mixture per acre.

In one embodiment of the invention, the treated soil is planted with the desired crop plant following the distribution of the toxicant compounds in the soil. Where minimum dosages of the toxicant compounds are distributed in soil, the treated soil may be immediately planted with the desired crop. Following the distribution of large dosages of the toxicant compounds, it is desirable that any planting operation not be carried out for a period of from several hours to several days, the exact period depending upon the concentration of the toxicant compounds in the soil and the resistance of the species concerned to the compounds. Where the mixture of toxicant compounds is employed for the treatment of the soil adjacent to the root system of established plants having resistance to the compounds and in side dressing operations, the existing vegetation is not unfavorably effected by minimum effective concentrations of the toxicant compounds temporarily present in the soil.

In carrying out the improved agronomic practice of the invention, the 2-chloro-6-methoxy-4-(trichloromethyl)pyridine and the S-methyl N-[(methyl carbamoyl)oxy]thioacetimidate may be mixed or ground together and the resulting product employed directly for the treatment of soil. However, the present method also embraces the employment of a liquid or dust composition wherein the mixed active compounds are applied to the soil in admixture with an inert adjuvant as a carrier. In such usage, the active compounds may be modified with one or a plurality of additaments or soil treating or parasiticide adjuvants, including water or other liquid carriers, surface active dispersing agents and finely divided inert solids. Depending on the concentration of toxicant compounds, such augmented compositions are adapted to be distributed in soil, or employed as concentrates and subsequently diluted with additional inert carrier to produce the ultimate treating compositions.

Liquid compositions containing the 2-chloro-6-methoxy-4-(trichloromethyl)pyridine and the S-methyl N-[(methyl carbamoyl)oxy]thioacetimidate in the desired amounts may be prepared by dissolving the compounds in a liquid organic carrier at ordinary temperatures. Suitable liquid organic carriers include liquid aliphatic and aromatic compounds such as acetone, toluene, xylenes, naphthas and hydrocarbon mixtures derived by the distillation of petroleum or coal. Depending on the concentration of the mixture of toxicants, such augmented compositions are adapted to be distributed in the soil or otherwise employed as concentrates and subsequently diluted with additional carrier to produce the ultimate treating compositions. Aqueous liquid compositions containing the desired amount of the mixture of toxicants in water can be prepared by dispersing the toxicants in water with the aid of a suitable surface active dispersing agent such as an ionic or non-ionic emulsifying agent. Such compositions may contain one or more water immiscible solvents for the mixture of toxicants, and in such compositions the carrier comprises an aqueous emulsion, i.e., a mixture of water immiscible solvent, emulsifying agent and water. Dispersing and emulsifying agents which can be employed in the compositions include the condensation products of alkylene oxides with phenols and organic acids, alkyl aryl sulfonates, polyoxyethylene derivatives of sorbitan esters, complex ether alcohols, mahogany soaps and the like. In another method, aqueous liquid compositions containing the mixture of toxicants can be prepared by dissolving said toxicants in a water miscible solvent such as acetone or methyl ethyl ketone and then diluting said solution with water to produce the ultimate treating compositions. These compositions may also include an ionic or non-ionic emulsifying agent, if desired.

In the preparation of dust compositions, the 2-chloro-6-methoxy-4(trichloromethyl)pyridine and the S-methyl N-[(methyl carbamoyl)oxy]thioacetimidate are dispersed in and on a finely divided inert solid such as talc, chalk, gypsum and the like. In such operations, the carrier is mechanically ground with the compound or wet with a volatile organic solvent solution thereof. Similarly, dust compositions containing the mixture of toxicants can be prepared from various of the solid, surface active dispersing agents, such as bentonite, fuller's earth, attapulgite and other clays. Depending on the proportions of ingredients, these dust compositions may be employed as concentrates and subsequently diluted with additional solid surface active dispersing agent or with talc, chalk or gypsum and the like to obtain the desired amount of the active compounds in a composition adapted to be employed for the treatment of soil. Also, such concentrate dust compositions may be dispersed in water with or without the aid of a dispersing agent to form aqueous soil treating compositions.

In formulating the compositions, it is essential to maintain the proportions of from about 1 part by weight of 2-chloro-6-methoxy-4-(trichloromethyl)pyridine to form ⅛ to 16 parts by weight of S-methyl N-[(methyl carbamoyl)oxy]thioacetimidate and to provide an effective amount of said mixture in the finished composition in order to maintain the desired synergistic effect. The concentration of the mixture of toxicants in liquid compositions employed to supply the desired dosage generally is from about 0.00001 to 50 percent by weight, although compositions employing as high as 90 percent may be employed. In dusts, the concentration of the mixture of toxicants may be from about 0.08 to 20 percent by weight. In compositions to be employed as concentrations, the mixture of toxicants may be present in a concentration of from about 5 to 95 percent by weight.

When operating in accordance with the present invention, the composition can be employed as an at-planting-time-treatment such as, for example, during transplant operations or the soil may be impregnated with the mixture of toxicant compounds, or a composition containing the toxicants, in any convenient fashion, e.g., by simple mixing with the soil, by applying to the surface of soil and thereafter dragging or disking into the soil to the desired depth, or by employing water to accomplish the penetration and impregnation. In a preferred procedure, the impregnation is carried out with the water employed to irrigate the soil.

The expressions "growth media" or "soil" are employed in the present specification and claims in their broadest sense to be inclusive of all conventional "soils," as defined in Webster's New International Dictionary, Second Edition, Unabridged, published in 1937 by G. and C. Merriam Co., Springfield, Mass. Thus, the terms refer to any substances or media in which vegetation may take root and grow, and are intended to include not only earth but compost, manure, muck, humus, and sand and the like, adapted to support plant growth.

DESCRIPTION OF THE PREFERRED EMBODIMENTS

The following examples illustrate the present invention and the manner by which it can be practiced but, as such, should not be construed as limitations upon the overall scope of the same.

EXAMPLE 1

Four-ounce jars were filled with 1 inch of vermiculite and thereafter to the top with moist sandy loam soil, naturally infested with root-knot nematodes. The soil was compacted to a depth of within one-half inch from the top of the jar. Predetermined amounts of acetone solutions containing the compounds 2-chloro-6-methoxy-4-(trichloromethyl)pyridine or S-methyl N-[(methyl carbamoyl)oxy]thioacetimidate prepared by dissolving predetermined amounts of the one of the compounds in a predetermined amount of aqueous acetone were drenched onto the soil and Teflon lined screw lids were attached to the jars. At the same time, additional soil-filled jars were treated with aqueous acetone alone to serve as controls. The jars were incubated at 65°–75°F. for 1 week and thereafter the lids removed and five cucumber seeds placed on the soil surface and covered with a sand cup. The jars were placed in a greenhouse under conditions conducive to good plant growth for 3 weeks. At the end of this period, the plants were removed and the roots washed free of soil and examined and grated for incidence of nematode galling according to the following grading system:

Grading System

| | No. of Galls = | % Control Over Control Plants |
|---|---|---|
| Ungalled roots | 0 | 100 |
| Very lightly galled roots | 1–2 | 90–95 |
| Lightly galled roots | 3–6 | 75–89 |
| Light-medium galled roots | 7–15 | 50–74 |
| Medium galled roots | 16–20 | 30–49 |
| Medium-heavy galled roots | 21–30 | 20–29 |
| Heavily galled roots | 31–50 | 10–19 |
| Very heavily galled roots | 51–100 | 0–9 |

Table I

| Run No. (1) | Chemical (2) | Amount in Pounds per Acre | Chemical (3) | Amount in Pounds per Acre | Ratios of Chemicals A:B | Expected Control in Percent (4) | Actual Control in Percent | Percent Increase over Expected Control (5) |
|---|---|---|---|---|---|---|---|---|
| 1 | — | — | — | — | — | — | 0 | — |
| 2 | A | 0.5 | — | — | — | — | 0 | — |
| 3 | A | 1.0 | — | — | — | — | 0 | — |
| 4 | A | 2.0 | — | — | — | — | 0 | — |
| 5 | A | 4.0 | — | — | — | — | 0 | — |
| 6 | A | 8.0 | — | — | — | — | 50 | — |
| 7 | — | — | B | 0.5 | — | — | 25 | — |
| 8 | — | — | B | 2.0 | — | — | 25 | — |
| 9 | — | — | B | 4.0 | — | — | 25 | — |
| 10 | — | — | B | 8.0 | — | — | 83 | — |
| 11 | A | 0.5 | B | 4.0 | 1:8 | 25 | 50 | 100 |
| 12 | A | 1.0 | B | 4.0 | 1:4 | 25 | 75 | 200 |
| 13 | A | 2.0 | B | 2.0 | 1:1 | 25 | 50 | 100 |
| 14 | A | 2.0 | B | 4.0 | 1:2 | 25 | 75 | 200 |
| 15 | A | 4.0 | B | 2.0 | 2:1 | 0 | 70 | > 100 (6) |
| 16 | A | 4.0 | B | 4.0 | 1:1 | 25 | 75 | 200 |
| 17 | A | 8.0 | B | 2.0 | 4:1 | 63 | 83 | 32 |
| 18 | A | 8.0 | B | 4.0 | 2:1 | 63 | 80 | 27 |

(1) Run Nos. 1–10 are control runs with Run No. 1 being a no chemical control (acetone-water alone)
(2) Chemical A represents 2-chloro-6-methoxy-4-(trichloromethyl)pyridine
(3) Chemical B represents S-methyl N-[(methyl carbamoyl)oxy]thioacetimidate
(4) Expected controls = percent control by chemical A + percent control by Chemical B (minus) $\dfrac{\text{percent control by Chemical A} \times \text{percent control by Chemical B}}{100}$ (5) Percent increase over expected control = $\dfrac{\text{actual control}}{\text{expected control}} \times 100 - 100$ (6) Percent increase too great to be computed

EXAMPLE II

Four-ounce jars were filled with 1 inch of vermiculite and thereafter to the top with moist sandy loam soil, heavily infested naturally with root-knot nematodes. The soil was compacted to a depth of within one-half inch from the top of the jar. Predetermined amounts of acetone solutions containing the compounds 2-chloro- 6-methoxy-4-(trichloromethyl)pyridine or S-methyl N-[(methyl carbamoyl)oxy]thioacetimidate prepared by dissolving predetermined amounts of the one of the compounds in a predetermined amount of acetone-water were drenched onto the soil and Teflon lined screw lids were attached to the jars. At the same time, additional soil-filled jars were treated with acetone-water alone to serve as controls. The jars were incubated at 65°–75°F. for 1 week and thereafter the lids were removed and five tomato seeds were placed on the soil surface and covered with a sand cap. The jars were placed in a greenhouse under conditions conducive to good plant growth for 3 weeks. At the end of this period, the plants were removed and the roots washed free of soil and examined and graded for incidence of nematode galling by the system set forth hereinabove in Example I. The results of this examination, the ratios and amounts of the chemicals employed are set forth below in Table II.

Table II

| Run No. (1) | Chemical (2) | Amount in Pounds per Acre | Chemical (3) | Amount in Pounds per Acre | Ratios of Chemicals A:B | Expected Control in Percent (4) | Actual Control in Percent | Percent Increase over Expected Control (5) |
|---|---|---|---|---|---|---|---|---|
| 1 | — | — | — | — | — | — | 0 | — |
| 2 | A | 0.25 | — | — | — | — | 0 | — |
| 3 | A | 0.5 | — | — | — | — | 0 | — |
| 4 | A | 1.0 | — | — | — | — | 25 | — |
| 5 | A | 4.0 | — | — | — | — | 25 | — |
| 6 | A | 8.0 | — | — | — | — | 50 | — |
| 7 | — | — | B | 0.5 | — | — | 0 | — |
| 8 | — | — | B | 1.0 | — | — | 0 | — |
| 9 | — | — | B | 2.0 | — | — | 0 | — |
| 10 | — | — | B | 4.0 | — | — | 88 | — |
| 11 | A | 0.25 | B | 0.5 | 1:2 | 0 | 50 | > 100 (6) |
| 12 | A | 0.25 | B | 4.0 | 1:16 | 88 | 100 | 14 |
| 13 | A | 0.5 | B | 2.0 | 1:4 | 0 | 70 | > 100 (6) |
| 14 | A | 1.0 | B | 1.0 | 1:1 | 25 | 70 | 180 |
| 15 | A | 1.0 | B | 2.0 | 1:2 | 25 | 38 | 52 |
| 16 | A | 4.0 | B | 2.0 | 2:1 | 25 | 50 | 100 |
| 17 | A | 8.0 | B | 1.0 | 8:1 | 50 | 90 | 80 |
| 18 | A | 8.0 | B | 2.0 | 4:1 | 50 | 88 | 76 |

(1) Run Nos. 1–10 are control runs with Run No. 1 being a no chemical control (acetone-water alone)
(2) Chemical A represents 2-chloro-6-methoxy-4-(trichloromethyl)pyridine
(3) Chemical B represents S-methyl N-[(methyl carbamoyl)oxy]thioacetimidate
(4) Expected controls = percent control by chemical A + percent control by Chemical B (minus)
  $$\frac{\text{percent control by Chemical A} \times \text{percent control by Chemical B}}{100}$$

(5) Percent increase over expected control = $\frac{\text{actual control}}{\text{expected control}} \times 100 - 100$ (6) Percent increase too great to be computed Data from Tables I and II illustrate that better nematode control was obtained employing the two toxicants together than would be expected from the results obtained from employing each of the two toxicants alone. These data are obtained according to the technique described in Colby, "Calculating Synergistic and Antagonistic Responses of Herbicide Combinations," Weeds, Vol. 15 (1967) pages 20–22 and Colby, "Greenhouse Evaluation of Herbicide Combinations" Proc. NEWCC, No. 19, pages 312–320.

What is claimed is:

1. A synergistic nematicidal composition for use in soil which comprises an inert carrier and a mixture of toxicants consisting of about 1 part by weight of 2-chloro-6-methoxy-4(trichloromethyl)pyridine and from about ⅛ to about 16 parts by weight of S-methyl N-[(methyl carbamoyl)oxy]thioacetimidate, said mixture being present in an amount of from about 0.00001 to 90 percent by weight of the total composition.

2. The composition as defined in claim 1 wherein the carrier is an inert liquid organic carrier.

3. The composition as defined in claim 2 wherein the composition is present as an aqueous dispersion and the mixture of toxicants is present in an amount of from about 0.00001 to 50 percent by weight of the total composition.

4. A method for killing nematodes in soil which comprises applying to said soil an active toxicant mixture in an amount of from about 0.013 to about 20 pounds of said active toxicant mixture per acre of the soil, said active toxicant mixture comprising about 1 part by weight of 2-chloro-6-methoxy-4-(trichloromethyl)pyridine and from about ⅛ to about 16 parts by weight of S-methyl N-[(methyl carbamoyl)oxy]-thioacetimidate.

5. The method as defined in claim 4 wherein said soil is impregnated with an aqueous dispersion of said active toxicant mixture and wherein the active toxicant mixture is present in an amount of from about 0.00001 to 50 percent by weight of the aqueous dispersion.

6. The method as defined in claim 4 wherein said toxicant mixture is applied in an amount of from about 0.25 to about 20 pounds per acre.

* * * * *